United States Patent [19]
Rahnema

[11] Patent Number: 6,072,841
[45] Date of Patent: Jun. 6, 2000

[54] BLOCK PHASE ESTIMATOR FOR THE COHERENT DETECTION OF NON-DIFFERENTIALLY PHASE MODULATED DATA BURSTS ON RICIAN FADING CHANNELS

[75] Inventor: Moe Rahnema, Gaithersburg, Md.

[73] Assignee: Hughes Electronics Corporation, El Segundo, Calif.

[21] Appl. No.: 08/886,637

[22] Filed: Jul. 1, 1997

[51] Int. Cl.[7] .................................................. H04L 27/227
[52] U.S. Cl. .......................... 375/325; 375/329; 375/344; 329/304; 329/345
[58] Field of Search ..................... 375/325, 326, 375/329, 332, 344, 279, 280, 281; 329/306, 304, 346, 345; 455/208, 205

[56] References Cited

U.S. PATENT DOCUMENTS

| | | |
|---|---|---|
| 4,887,050 | 12/1989 | Borth et al. ............................... 329/318 |
| 4,983,906 | 1/1991 | Hiller ..................................... 342/76.47 |
| 5,272,446 | 12/1993 | Chalmers et al. ....................... 375/329 |
| 5,473,637 | 12/1995 | Gardner .................................. 375/329 |
| 5,588,026 | 12/1996 | Ishikawa et al. ........................ 375/329 |
| 5,867,059 | 2/1999 | Huang et al. ............................ 375/326 |

*Primary Examiner*—Young T. Tse
*Attorney, Agent, or Firm*—John T. Whelan; Michael W. Sales

[57] ABSTRACT

A method, and related apparatus, for coherently demodulating phase-modulated data which is coherently transmitted (i.e., without the use of differential encoding of the data) on Rician fading channels. The method uses phase unwrapping and phase interpolation, in conjunction with block phase estimation, to achieve a performance comparable with coherent detection of coherently transmitted data while reducing processing requirements.

23 Claims, 17 Drawing Sheets

BLOCK PHASE ESTIMATOR FOR THE COHERENT DETECTION OF NON-DIFFERENTIALLY PHASE MODULATED DATA BURSTS ON RICIAN FADING CHANNELS

BACKGROUND OF THE INVENTION

The present invention relates to data communications, and more particularly, to coherent demodulation of coherently transmitted phase modulated data bursts on rf channels subject to Rician fading.

Satellite-based mobile communication systems are being developed for economically providing mobile communication service on a global basis. As shown in FIG. 1, a satellite-based communication system 1 may have a relatively large geographical coverage area because the satellite's antennas may be configured to cover areas as large as a continent.

Unlike existing cellular mobile communication systems, satellite-based mobile communication systems are subject to Rician channel fading. Rician channel fading results from a combination of fading due to atmospheric effects and Rayleigh fading which is inherent in mobile communication systems. For various reasons, including those relating to Rician fading, digital methods are generally implemented in satellite-based mobile communication systems.

In a typical implementation, an audio voice signal is converted to a digital signal and transmitted through the atmosphere 3 such that a portion of the signal is captured by a satellite receiver. The satellite 4 relays the digital signal to a ground-based station 4 for connection with land-based telephone lines or to another mobile station 2. Because an audio voice signal has a relatively small bandwidth, several signals are often time and/or frequency multiplexed within a larger bandwidth of the satellite's communications channel. Time multiplexing, for example, involves sending the digital audio signals as relatively short data bursts. Further, phase modulation is often used to encode the digital data signal.

The mobile station, and in some systems, the satellite, must decode the digital signal after it is transmitted across the data channel. The characteristics of the data channel, including phase fluctuations due to noise or Rician fading, alter the phase encoding of the transmitted data. Existing decoding methods give rise to phase ambiguities due to cycle slips and, accordingly, phase-modulated data is generally differentially encoded to resolve the phase ambiguities in the carrier phase estimation process. Differential encoding results in a detection penalty of at least 1 dB, which is significant under the limited power constraints of mobile communication systems.

Accordingly, there exists a need for mobile and satellite stations that efficiently demodulate coherently transmitted phase-modulated data bursts on rf channels subject to Rician fading. The present invention satisfies this needs.

SUMMARY OF THE INVENTION

The present invention is embodied in a method, and related apparatus, for coherent demodulation of phase-modulated digital data symbols which are coherently transmitted through an rf channel. The invention achieves the performance of coherent detection while reducing processing requirements and resolving phase ambiguities. The method entails performing block-phase estimation on the transmitted data symbols to estimate the carrier phase and performing phase unwrapping on the block-phase estimated signal to account for rf channel phase transition effects. The carrier frequency tracking loop errors and rf channel phase transition effects are then removed from the transmitted phase-modulated data symbols based on the block phase estimation and the phase unwrapping.

In more detailed features of the invention, the block phase estimation includes performing a phase interpolation using a moving averaging window that covers a predetermined block of data symbols. The predetermined block of data symbols may include 41 symbols and the associated averaging window is moved a specified number of symbols, such as 10 symbols, between phase interpolations.

In other more detailed features of the invention, the block phase estimation involves processing the phase-modulated data using a non-linear operation such as, for QPSK-modulated data symbols, a quadrupling of the data symbol's base angle. The method of the present invention may further include performing a discrete Fourier transform on the transmitted data symbols before performing the block-phase estimation and phase unwrapping to determine a frequency offset of the transmitted data symbols and eliminating any frequency offset contributing 90 degrees or more between data symbols.

An apparatus embodying the present invention includes a baseband converter, an analog-to-digital converter, a digital signal processor and a frequency controller. The baseband converter has a mixing frequency control input responsive to a frequency control signal for downconverting the data symbols transmitted through the rf channel to a baseband signal. The frequency control signal is for causing the baseband converter to remove frequency tracking error from the baseband signal. The analog-to-digital converter samples the baseband signal and generates a sampled baseband signal. The digital signal processor performs block-phase estimation and phase unwrapping on the block-phase estimated sampled baseband signal and generates the frequency offset signal. The frequency controller, based on the frequency offset signal, generates the frequency control signal.

BRIEF DESCRIPTION OF THE DRAWINGS

The above and other aspects, features and advantages of the present invention will be more apparent from the following more particular description thereof, presented in conjunction with the following drawings wherein:

FIG. 6 is a block diagram of a frequency tracking loop.

Corresponding reference characters indicate corresponding components throughout the several views of the drawings.

DESCRIPTION OF THE PREFERRED EMBODIMENTS

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
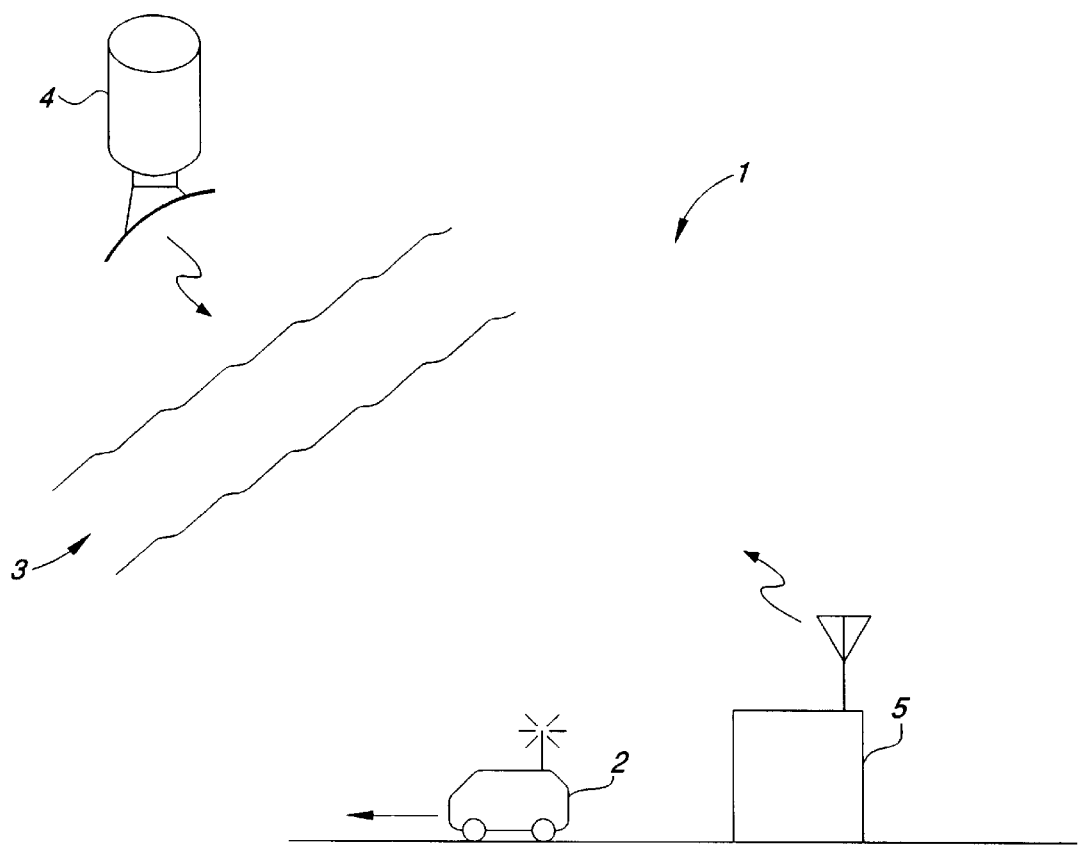
FIG. 1 is a schematic view of a satellite-based mobile communication system.
Figure 2:
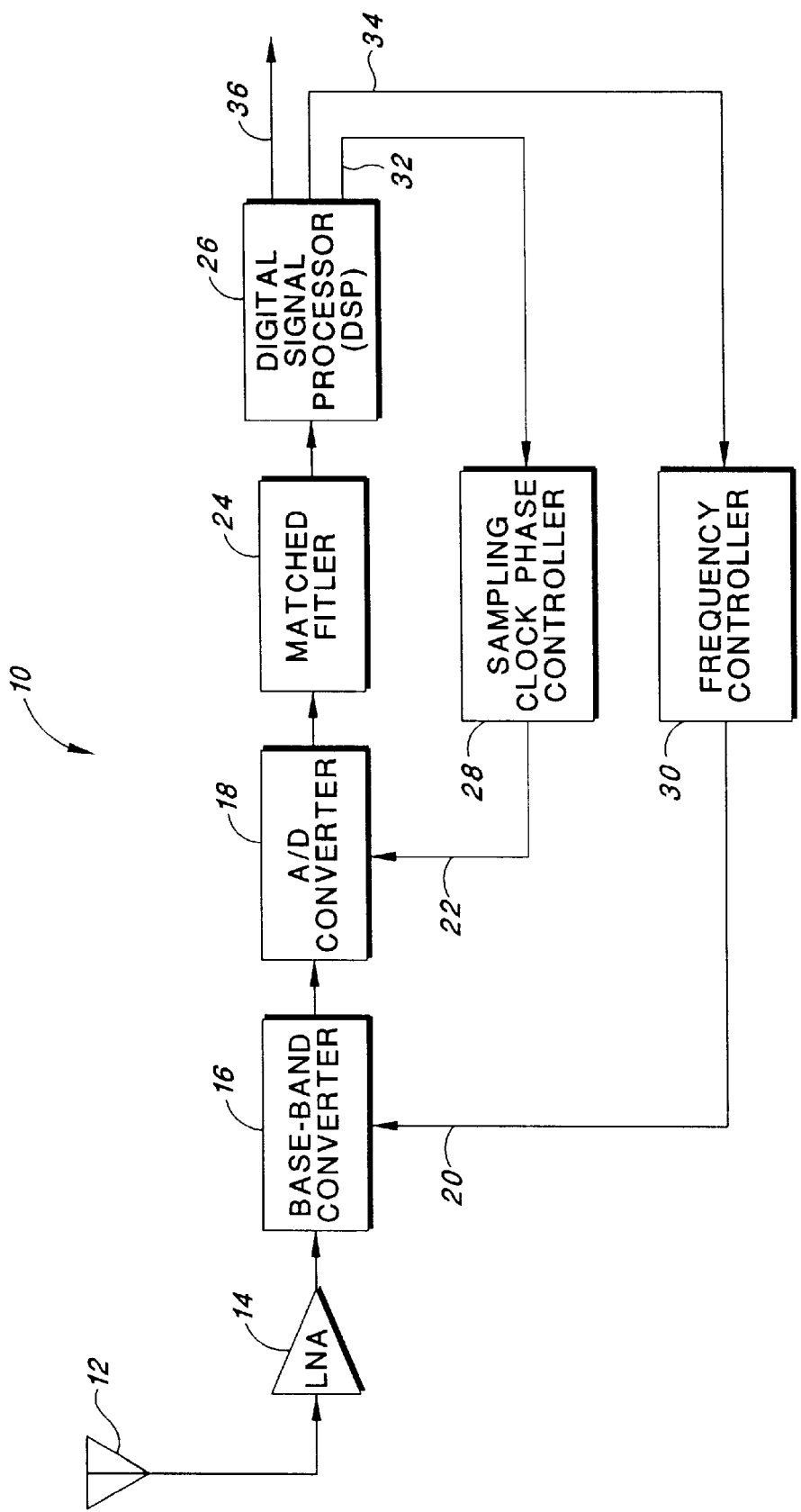
FIG. 2 is a block diagram of a digital data symbol timing recovery system for use in a communication system, in accordance with the present invention.
Figure 3:
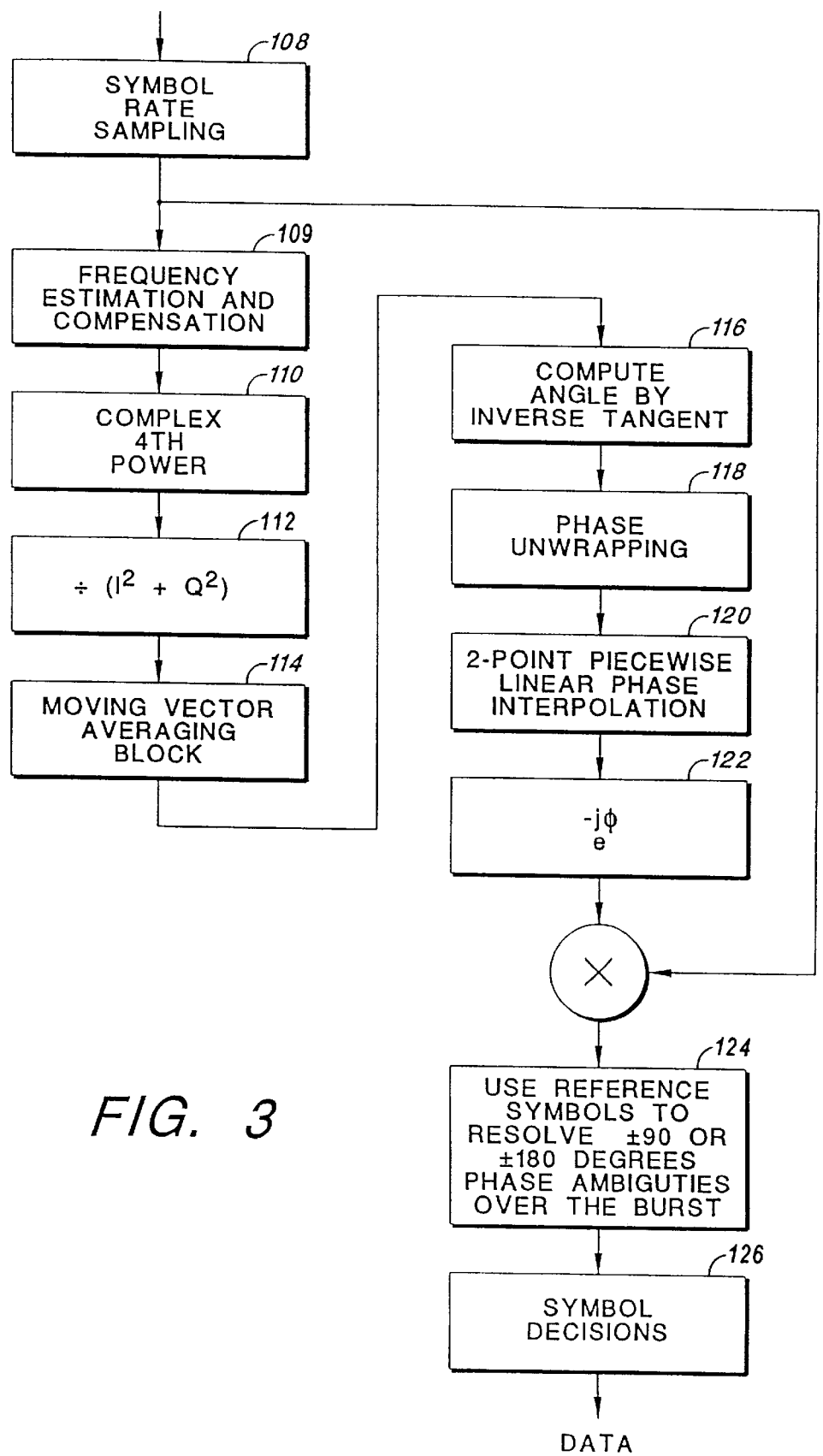
FIG. 3 is a flow chart of the process of the present invention for implementation by the demodulation system of FIG. 2.

A shown in the exemplary drawings, and in particular to FIGS. 2 and 3, the present invention resides in a method, and related apparatus, for coherently demodulating a phase-modulated digital data burst. The coherent detection technique of the invention uses signal processing techniques for removing frequency offsets and phase slips from a received signal.

Before describing the method in detail, it would be helpful to review an apparatus, shown in FIG. 2, for implementing the symbol timing recovery technique. The apparatus 10 includes an analog section and a digital section. The analog section has an antenna 12, a low-noise amplifier (LNA) 14, a baseband converter 16, and an A-D converter 18. The baseband converter includes a frequency control input 20 for controlling the frequency of the baseband converter and the A-D converter includes a timing control input 22 for controlling the time at which the A-D converter takes samples of an incoming signal. The individual components of the analog section are readily available and known to one of skill in the art.

The digital section includes a matched filter 24, a digital signal processor (DSP) 26, a sampling clock phase controller 28 and a frequency controller 30. The DSP has three outputs 32, 34, and 36. The first output 32 provides a phase timing signal to the sampling clock phase controller for controlling the sample timing of the A/D converter so that the symbols are sampled at or near symbol maximum. The second output 34 provides a frequency offset signal for removing frequency offsets in the transmitted signal. The third output 36 is the decoded digital data signal.

Coherent demodulation of phase modulated data can provide up to about 0.8 dB gain in performance for bi-phase shift keying (BPSK modulation), and 2.2 dB for quadrature-phase shift keying (QPSK) modulations over non-coherent demodulation (see, e.g., Proakis, *Digital Communication*). The 2.2 dB performance gain that is achieved with coherent demodulation of QPSK is valuable in reducing the power requirements in both the satellite and the handheld mobile unit in mobile satellite communication system. Coherent demodulation is advantageously used on a fading rf channel having a fade rate (determined by the maximum Doppler shift) that is relatively slow compared to the modulation rate (i.e., the symbol rate), provided that a good mechanism is available for acquiring and tracking the carrier phase.

In TDMA burst communication, the carrier phase can vary randomly from burst to burst as a small error in the frequency tracking loops used by the downconverter's frequency synthesizer and may result in considerable phase difference from one burst to the next. For efficient use of the TDMA slot under these conditions, the carrier phase must be estimated for each burst in a time that is relatively short compared to the burst's length. For efficient recovery of the carrier phase, the phase estimation must be accomplished with a data burst having only a small preamble. This requirement is satisfied through the use of a technique which is generally known as block phase estimation and which is based on an open loop estimation of the carrier phase for each data burst.

In the block phase estimation technique, the modulation phase is first removed through a nonlinear operation on the complex baseband symbols which are obtained from the output of the matched filter sampled at the instant of maximum eye opening (block 108). However, before this is done, the frequency offset is estimated and compensated for (block 109). For QPSK data, the nonlinear operation consists of a quadrupling of the phase angle of the baseband symbols (block 110). The quadrupling operation reduces the modulation phases to either 0 degrees for a signal constellation format of 0, 90, 180, and 270 degrees, or to a constant value of 180 degrees for a signal constellation format of 45, 135, 225, and 315 degrees are used. Using the latter format, further multiplying the complex symbols by −1 will remove the residue modulation phase of 180 degrees. The nonlinear quadrupling operation results in a phase ambiguity of +/−90 or +/−180 degrees in the final recovered carrier phase because any phase offset of +/−90 or +/−180 degrees is lost as a result of the quadrupling operation. Such phase ambiguities, which are constant for the whole burst, may be removed and corrected using a few predetermined pilot or reference symbols that are known to the receiver. Use of reference symbols, however, fails to correct phase ambiguities resulting from channel phase transitions (cycle slips) of 90 or 180 degrees arising after the reference symbol. Alternatively, the symbols may be differential encoded and decoded to remove the phase ambiguities, including cycle slips. However, differential encoding typically results in a doubling of errors and, in the case of QPSK modulation, results in a 1 dB performance loss. This 1 dB performance loss is significant consideration in the design of a small power efficient handheld unit for use in mobile satellite communications. Accordingly, the present invention implements a method that prevents the phase ambiguities discussed above by incorporating a phase unwrapping technique that eliminates the phase ambiguities arising from the inverse tangent operation.

In the block phase estimation technique of the present invention, data is recovered in burst mode communications using a nonlinear operation generally of the form:

$$x+j\ y=r^n e^{jma} \quad (1)$$

which is performed on the downconverted baseband symbols that are output from the receiver matched filter. In equation 1, x and y are the quadrature components of the modulation removed baseband symbols, r and a are the magnitude and phase (also referred to as the base angle) of the matched filter output, for QPSK m is equal to 4 (block 110), resulting in a quadrupling of the phase and n may be any integer generally selected from the range of 1 to 4. The value of n may cause a performance difference of the phase estimation technique. A value of n=2 (block 112) is convenient from an implementation standpoint and provides advantageous performance in terms of minimizing the variance of the phase estimation and improving the bit error rate achieved in the coherent demodulation of the QPSK data. After the above nonlinear operation is performed on the burst of baseband complex symbols, the complex symbols are vector averaged in each block which is defined by a moving averaging window over the burst (block 114). The averaging process reduces the noise and results in a phaser whose phase is the modulo 2 $\pi$ of four times the sum of the phase induced by the channel and the phase contributed by any frequency offset left in the downconverted baseband symbols for the mid-block symbol location (the modulo 2 $\pi$ arises in the inverse tangent operation used to compute the angle). A block size, consisting of an odd number of symbols, is chosen such that the mid-block point falls on a symbol. As the window is moved over the burst in this averaging process, the carrier phase can be estimated for successive symbols in the burst except for the first and last (N−1)/2 symbols in the burst, where N refers to the block size. The block size is chosen empirically or through simulation to achieve a good balance between noise reduction and capturing the phase variations due to fading.

The carrier phases at each symbol location within the burst are obtained by a process of phase division and extrapolation for the first and last (N−1)/2 symbols. In the case of QPSK type modulation, the phase division first consists of a division by 4 to compensate for the earlier phase quadrupling done in the nonlinear operation for the removal of modulation prior to this phase estimation process. Using coherent encoding and detection, the modulo 2 $\pi$ operation inherent in the inverse tangent operation used to compute the phase angles may introduce phase transitions of +/−90 degrees within the burst after the division by 4, causing bursts of errors (block 116). The carrier phase in the phase quadrupled domain (used to remove the modulation for QPSK) may accumulate to values exceeding 2 $\pi$ as it progresses within the burst. This accumulation may result from either a residual frequency offset left in the downconverted baseband symbols or from noise or fading. This phase progression is considered before the phase division process (division by 4 for QPSK) in order to avoid the 90 degrees phase transitions within the burst. As mentioned before, differential encoding of the data is currently used to account for such 90 degree phase transitions or cycle slips. The technique of the present invention performs phase unwrapping (block 118) after the inverse tangent operation that is used to compute the phase angles in the block phase estimation approach. The phase unwrapping technique (block 118) advantageously avoids the use of differential encoding and decoding for resolving the stated phase ambiguities arising in the current application of block phase estimation to QPSK signals.

Because the carrier phases at consecutive symbols are highly correlated when the symbol rate is small compared to fade rate, it is not necessary to directly estimate the carrier phases at each symbol location. Accordingly, the moving averaging window in the block phase estimation process may be moved by more than one symbol at a time in which case the carrier phases at the in between points (symbols) is estimated indirectly using an appropriate interpolation technique. In a given implementation, the window spacing, as well as the block size (the window size), is advantageously chosen to achieve a good balance between reducing the processing requirements, averaging out the noise, and capturing the phase variations due to changing channel conditions.

Figure 4:
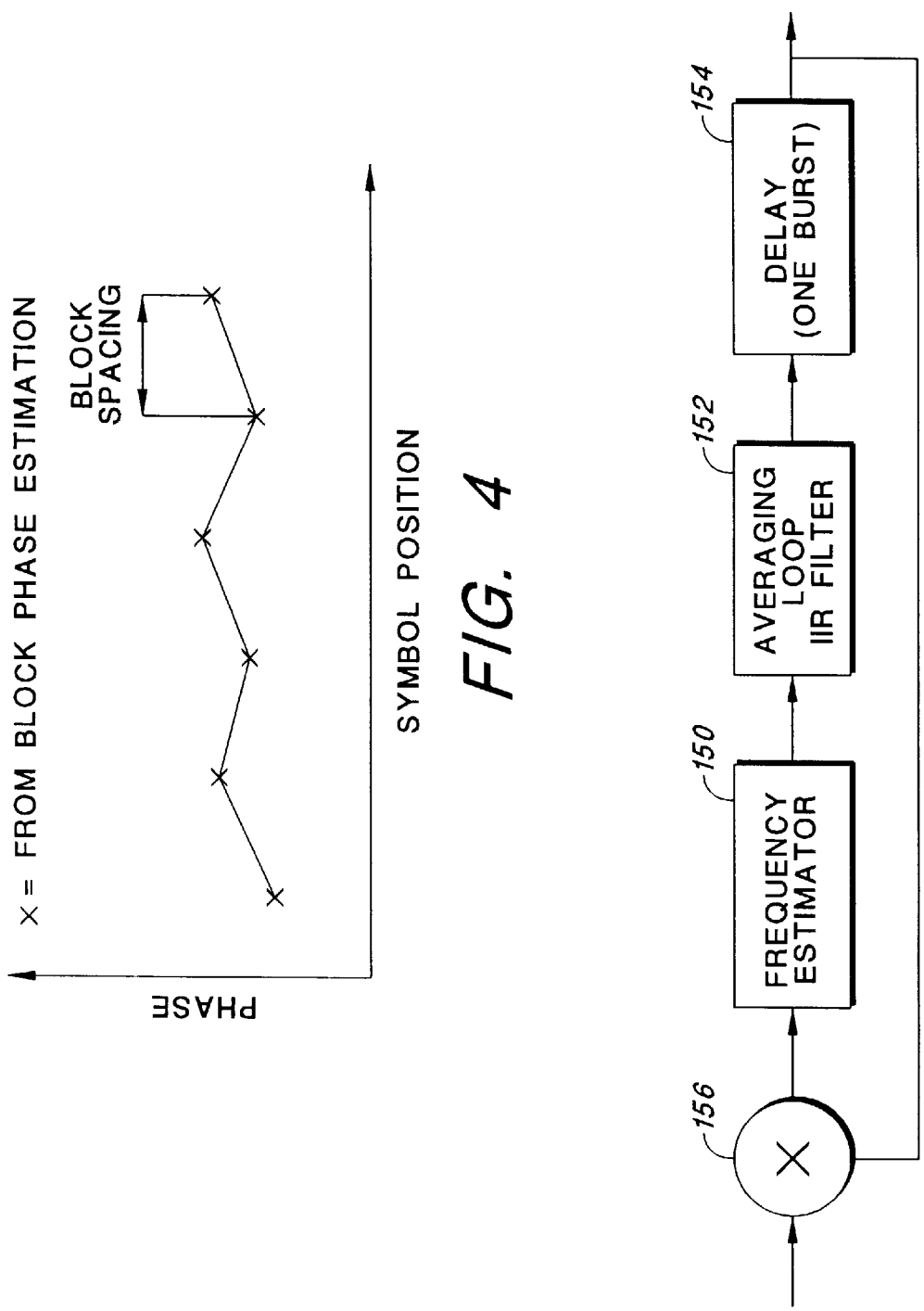
FIG. 4 is a graph of a two-point piecewise linear phase interpolation of the present invention.

The simple interpolation technique is based on connecting the adjacent points by straight lines as shown in FIG. 4. The linear interpolation is used on the assumption that a fixed frequency offset remaining in the downconverted baseband signal causes the carrier phase to vary linearly with time and thus to vary linearly over the burst (block 120). A 2-point piecewise linear interpolation generally performs better, i.e., reduces the bit error rates in the coherent demodulation, than a single linear curve fitting over all the symbols in the burst as the fade rate increases. This is because a 2-point piecewise linear interpolation is better able to capture local variations in the carrier phase caused by fading. The better performance of the 2-point piecewise linear interpolation is particularly noticeable at higher signal-to-noise ratios when the amount of averaging required to reduce the noise is not significant.

Phase unwrapping is used in the block phase estimation process using the inverse tangent operation to keep track of any channel phase jumps of 360 degrees in the n-th power domain where n=4 for QPSK modulated data (block 118). Phase jumps of 360 degrees are tracked so that no 90 degree phase transitions occur within the burst in the subsequent phase divisions such as division by 4 for QPSK modulated data.

Using the phase unwrapping technique, whenever the phase jumps are detected to more than 180 degrees or to less than −180 degrees in the successive symbol locations, separated by the block spacing used in the block estimation process, the phase is reduced or increased by 360 degrees, respectively. This method of phase unwrapping for coherent demodulation assumes that the phase increase or decrease between the successive symbol locations (separated by the block spacing in the block phase estimation process) due to noise or any residue frequency offset left in the downconversion process is limited to 180 degrees.

To express this phase unwrapping technique in pseudo-code form, the following notations are defined first:

K=the number of symbol locations for which channel phase is directly estimated in the block phase estimation method.

$a_i$=the i-th estimated phase, i=1,2, . . . K. These angles are converted to the range (0 to 2 $\pi$) in the inverse tangent operation.

$a^{uw}_i$=the unwrapped i-th estimated phase

Then, the following pseudo code is used to implement the basic phase unwrapping technique $a_0=\pi$ (initialization to $\pi$)
DO i=1 to K
IF$(a_{i-1}-a_i)>=\pi$,
THEN $a^{uw}_i=a_i+2\ \pi$
ELSE IF $(a_{i-1}-a_i)<-\pi$,
THEN $a^{uw}_i=a_i-2\ \pi$

END IF
END DO

The unwrapped phases are then used to remove the carrier phase from each downconverted baseband complex symbol before symbol decisions are made (block 122). Before symbol decisions are made (block 126), a number of reference symbols (known to the receiver) are transmitted within the burst and are used to remove possible phase ambiguities of ±90 or ±180 degrees that are lost in the phase quadrupling operation which is performed to remove the modulation phases prior to the application of the block phase estimation process (block 124).

The basic block phase estimation method used in the invention reduces with the amount of frequency offset left in the downconverted baseband signals by adding vectors (the modulation removed complex baseband signals) that are rotated away from each other by the amount of the frequency offset. An estimate of the frequency offset is used by an averaging frequency tracking loop to control and prevent a build up of excessive frequency offsets arising from drifts in the receiver down converter frequency synthesizer. A desirable upper limit on the tolerable frequency offset may be specified by requiring that the maximum vector rotation over the block size (the size of the moving averaging window in the block phase estimation process) be limited to +or −90 degrees. More specifically, the equation:

$$2\pi \cdot 4\Delta f \cdot T \cdot N < \pi/2 \quad (2)$$

must be satisfied in which: $\Delta f$=the residue frequency offset; $T$=symbol time; and $N$=block size in symbols. Any frequency offsets larger than determined by equation 2 above are estimated and subtracted out from the burst before performance of the block phase estimation technique discussed in the above sections.

Figure 5:
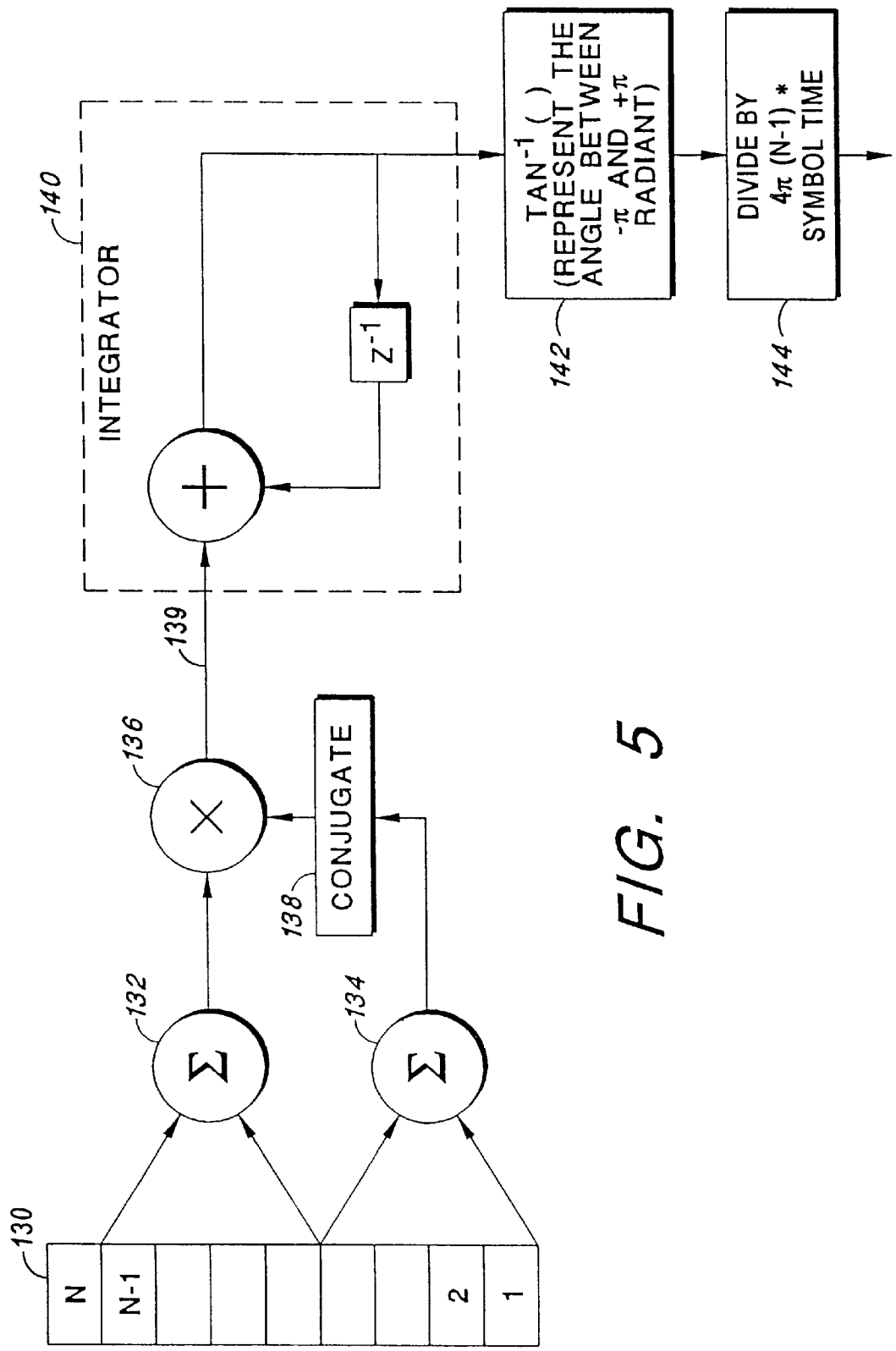
FIG. 5 is a flow graph of a bisected block method for estimating frequency offset, implemented by a DSP of the timing recovery system of FIG. 2.

Another aspect of the invention is a technique for estimating frequency offsets in the burst using a bisected block approach for frequency estimation shown in FIG. 5. The symbols 130 within the moving averaging window or the block are divided into the lower and upper half of the block (the Nth symbol is ignored because in this case the block size has to be even for division into two halves and vectorially summed separately). The vector sum 132 from the upper half of the block represents the phase offset for the middle of the lower half block, which is $\phi+4\Delta \cdot (N-3)/4$, where $\phi$ is the constant phase offset induced by the channel over the block, and $\Delta$ is the phase roll due to the frequency offset over a symbol interval. The factor of 4 multiplication represents the effect of the phase quadrupling done on the symbols to remove the modulation phase. The vector sum 134 from the lower half of the block similarly represents the phase offset at its middle which is: $\phi+4\Delta \cdot (3N-5)/4$. The difference between these two phases is: $4 \cdot \Delta(N-1)/2$, which is obtained by multiplying 136 the complex conjugate 138 of the vector sum 134 from the lower half of the block by the vector sum 132 from the upper half of the block. This difference is proportional to the frequency offset and is used to obtain an estimate of the frequency offset. The integrator 140 performs the processing by integrating (i.e., averaging) the vector output 139 from the complex conjugate multiplication as the burst is processed through the moving averaging block to reduce the effect of noise, and then computing and scaling down the angle of the resulting vector through an inverse tangent operation 142 as indicated in FIG. 5. In order to account for both positive and negative frequency offsets, the result from the inverse tangent operation is advantageously represented in the range from −π to +π radians. In order to reduce the effects of noise, the frequency offset thus computed from each burst is filtered, usually through a first order loop, and then used to reduce the frequency offset in successive bursts as they are received prior to the block phase demodulation process.

Because the inverse tangent operation results a value only in the range from −π to +π radians, aliasing will arise for large frequency offsets. This limits the frequency offset which may be estimated by this technique. Ignoring the effect of noise and fading, the limit is simply governed by the following relation:

$$|4 \cdot \Delta f \cdot 2 \pi \cdot T(N-1)/2| < \pi$$

or $$|\Delta f| < 0.25/T \cdot (N-1)]$$

However, in practice the limit will be smaller than the limit indicated by the above relation because of the effects of noise and fading which may randomly contribute to frequency offset (random FM). In such a case, frequency offsets in excess of the limit as determined by dividing the output of 142 by 4 $\pi(n-1)$* symbol time (144), may occur, and would need to be estimated and reduced by a different technique before the converted symbols are input to the block phase and frequency offset estimations discussed above. One technique for estimating the frequency offsets involves using a Discrete Fourier Transform (DFT) to provide the initial gross estimate of the frequency offset of the estimated data symbols before the above technique is used for a finer estimation. Generally, the estimated frequency offset is used by a frequency controller to generate a frequency control signal to reduce the offset. The frequency estimate obtained from the process shown in FIG. 5, which takes place at frequency estimator 150 in FIG. 6, is then smoothed through a normally 1st order averaging loop 152 (a single pole IIR filter) and then used to correct for the filtered estimated frequency 156 in the next burst 154, as shown in FIG. 6.

Figure 7:
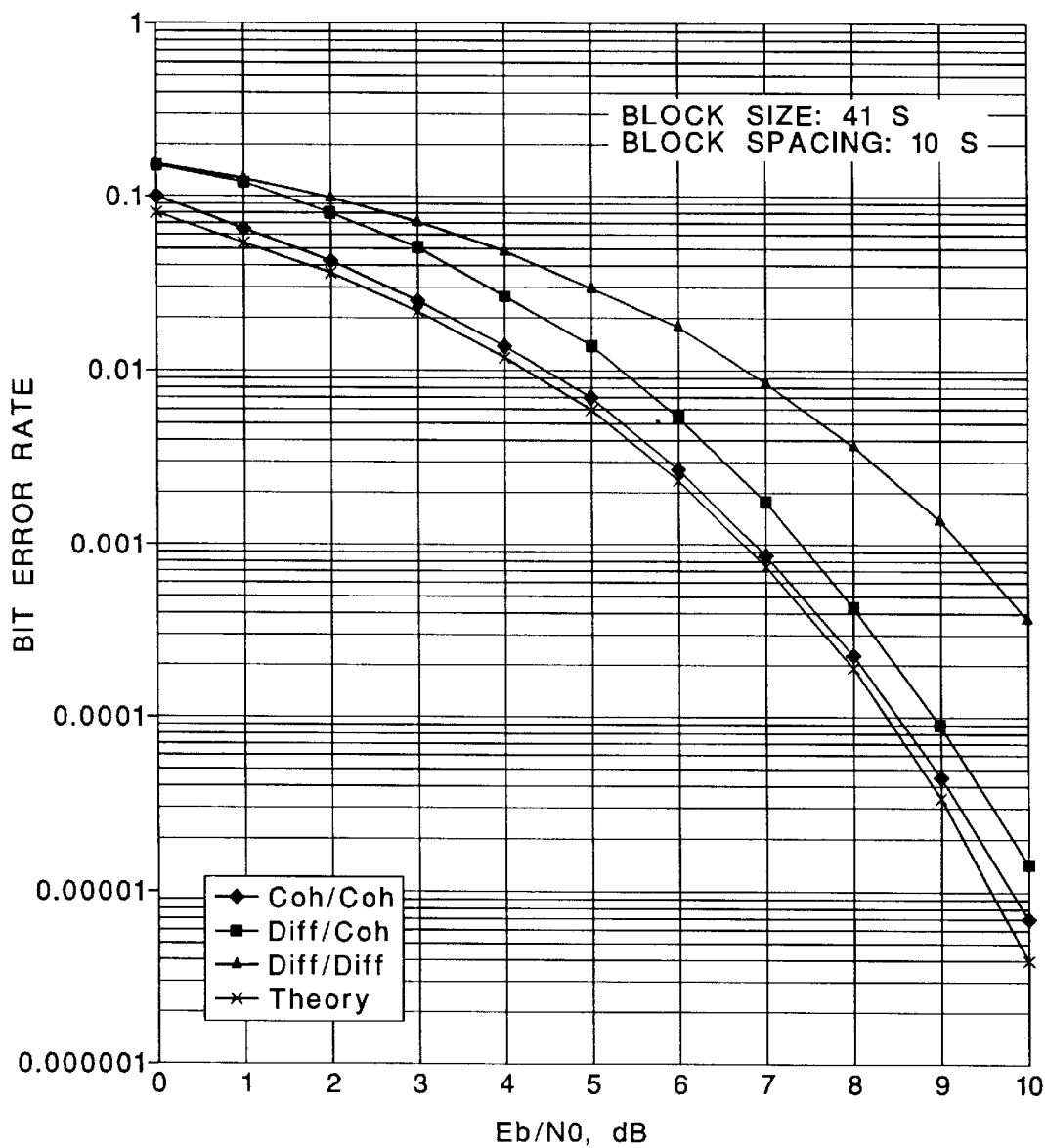
FIG. 7 is a graph of a performance comparison of coherent modulation and differential modulation on a non-fading gaussian channel.

Referring next to FIG. 7, a graph is shown of a performance comparison between a coherent modulation and a differential modulation on a non-fading gaussian channel. As seen, the coherent modulation yields the lower bit error rate at the same signal to noise ratio.

Figure 8:
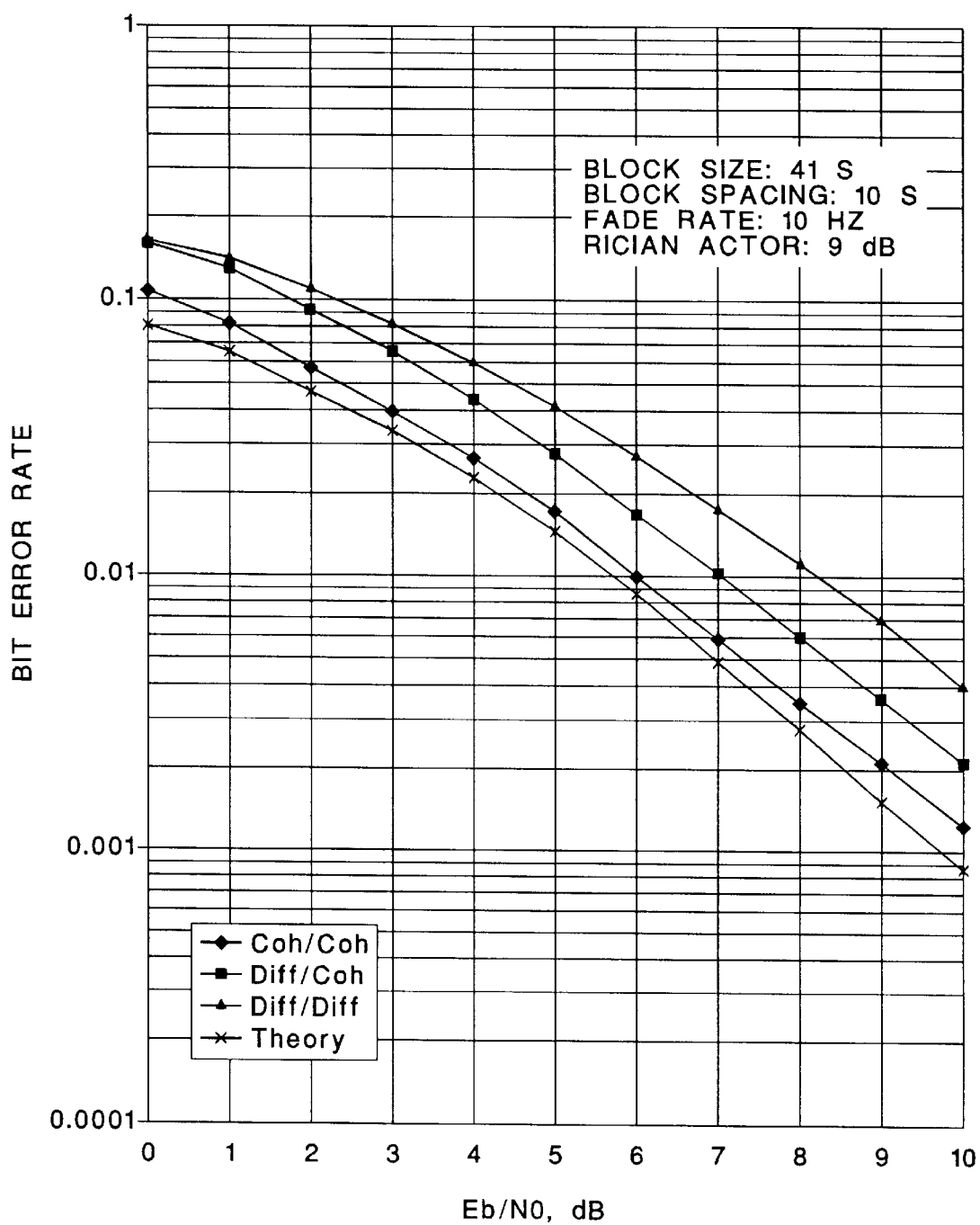
FIG. 8 is a graph of a performance comparison of coherent modulation and differential modulation on a low fade rate channel.

Referring next to FIG. 8, a graph is shown of a performance comparison of coherent modulation and differential modulation on a low fade rate channel. Again, as seen, the coherent modulation yields the lower bit error rate.

Figure 9:
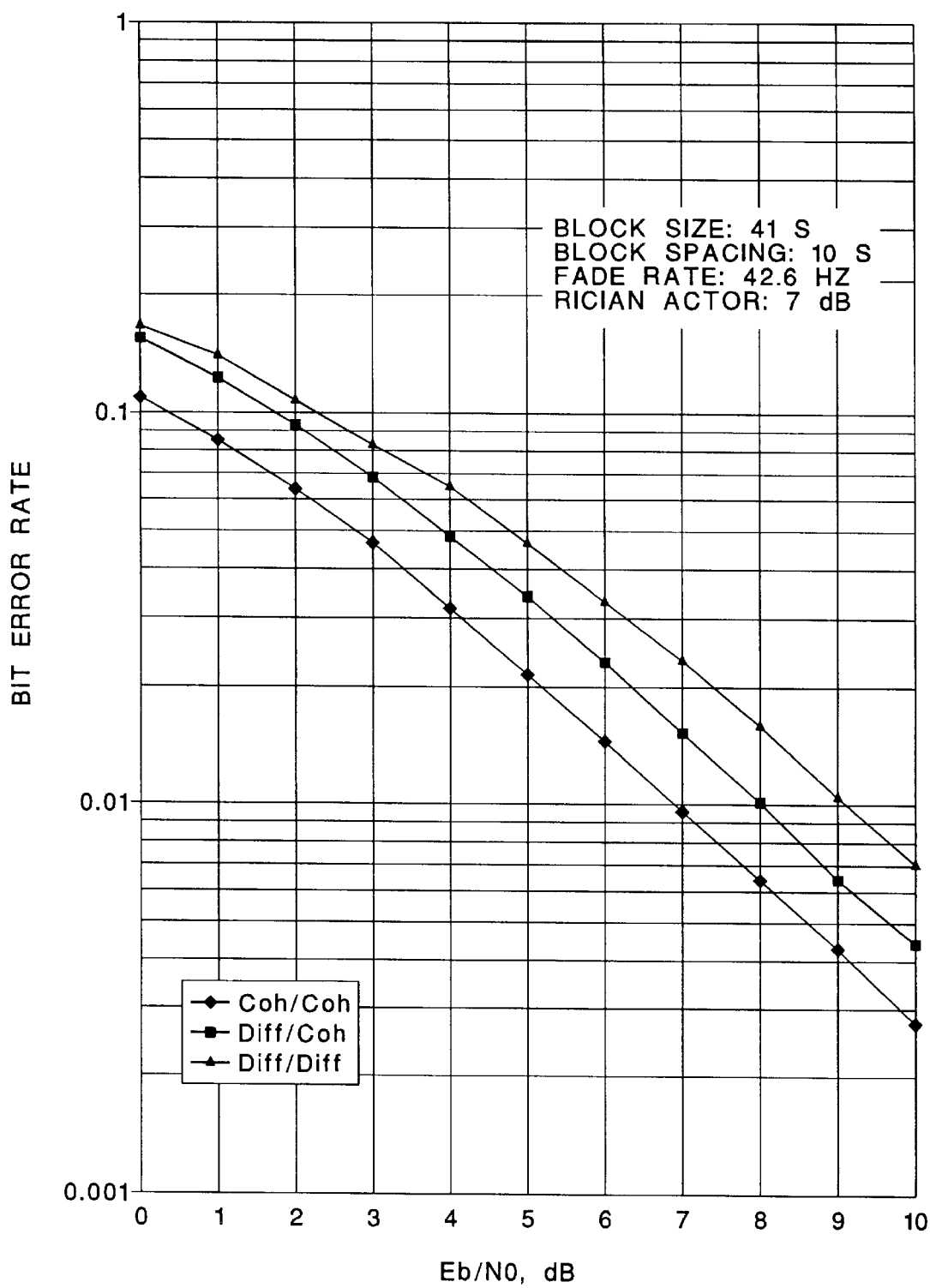
FIG. 9 is a graph of a performance comparison of coherent modulation and differential modulation on a Rician factor channel.

Referring next to FIG. 9, a graph is shown of a performance comparison of coherent modulation and differential modulation on a Rician factor channel. As seen, the coherent modulation yields the lower bit error rate.

Figure 10:
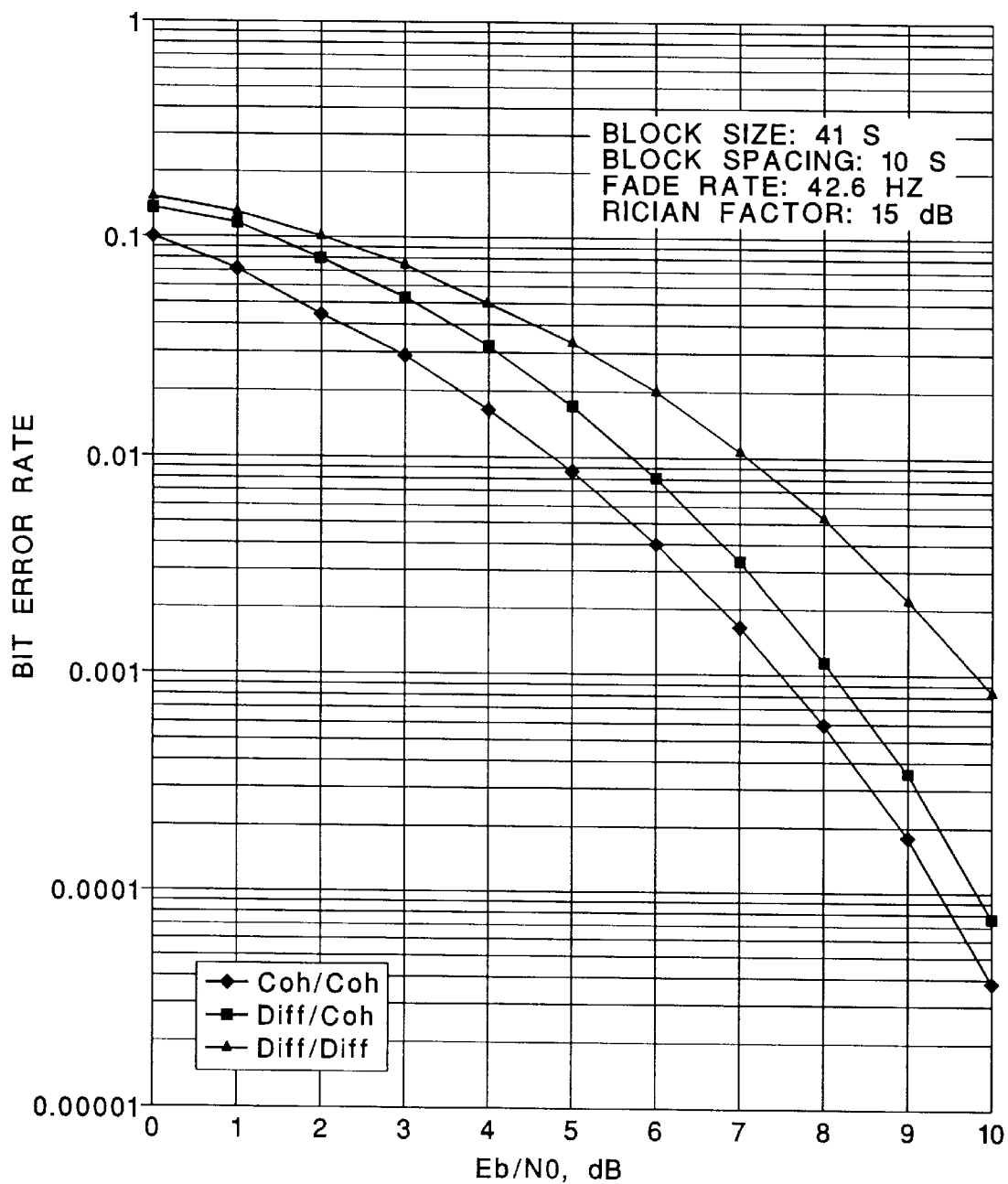
FIG. 10 is a graph of a performance comparison of coherent modulation and differential modulation on a low fade channel and a large Rician factor channel.

Referring next to FIG. 10, a graph is shown of a performance comparison of coherent modulation and differential modulation on a low fade channel and a large Rician factor channel. As seen, the coherent modulation yields the lower bit error rate.

Figure 11:
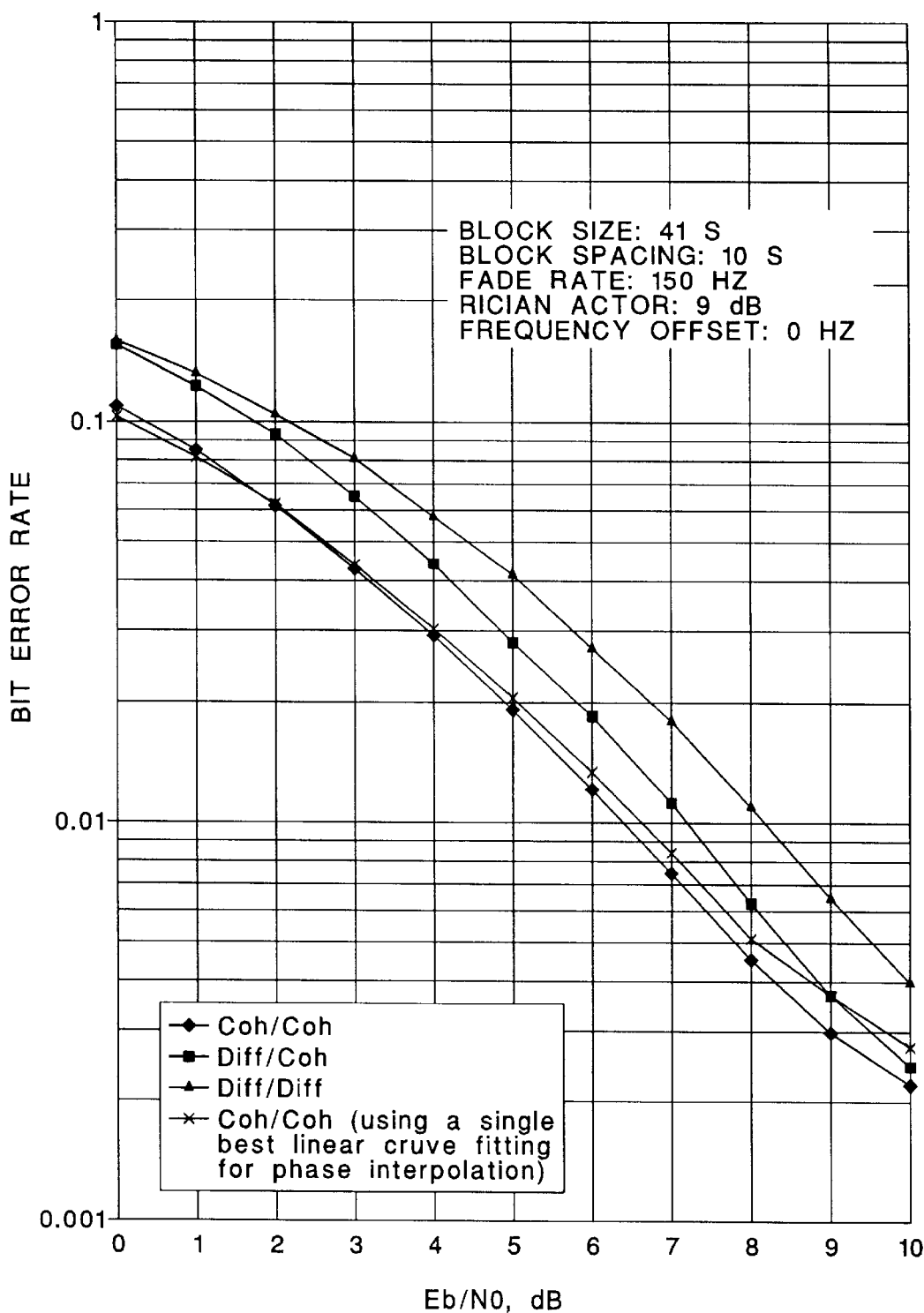
FIG. 11 is a graph of a performance comparison of coherent modulation and differential modulation on a fast fading Rician channel.

Referring next to FIG. 11, a graph is shown of a performance comparison of coherent modulation and differential modulation on a fast fading Rician channel. As seen, the coherent modulation yields the lower bit error rate.

Figure 12:
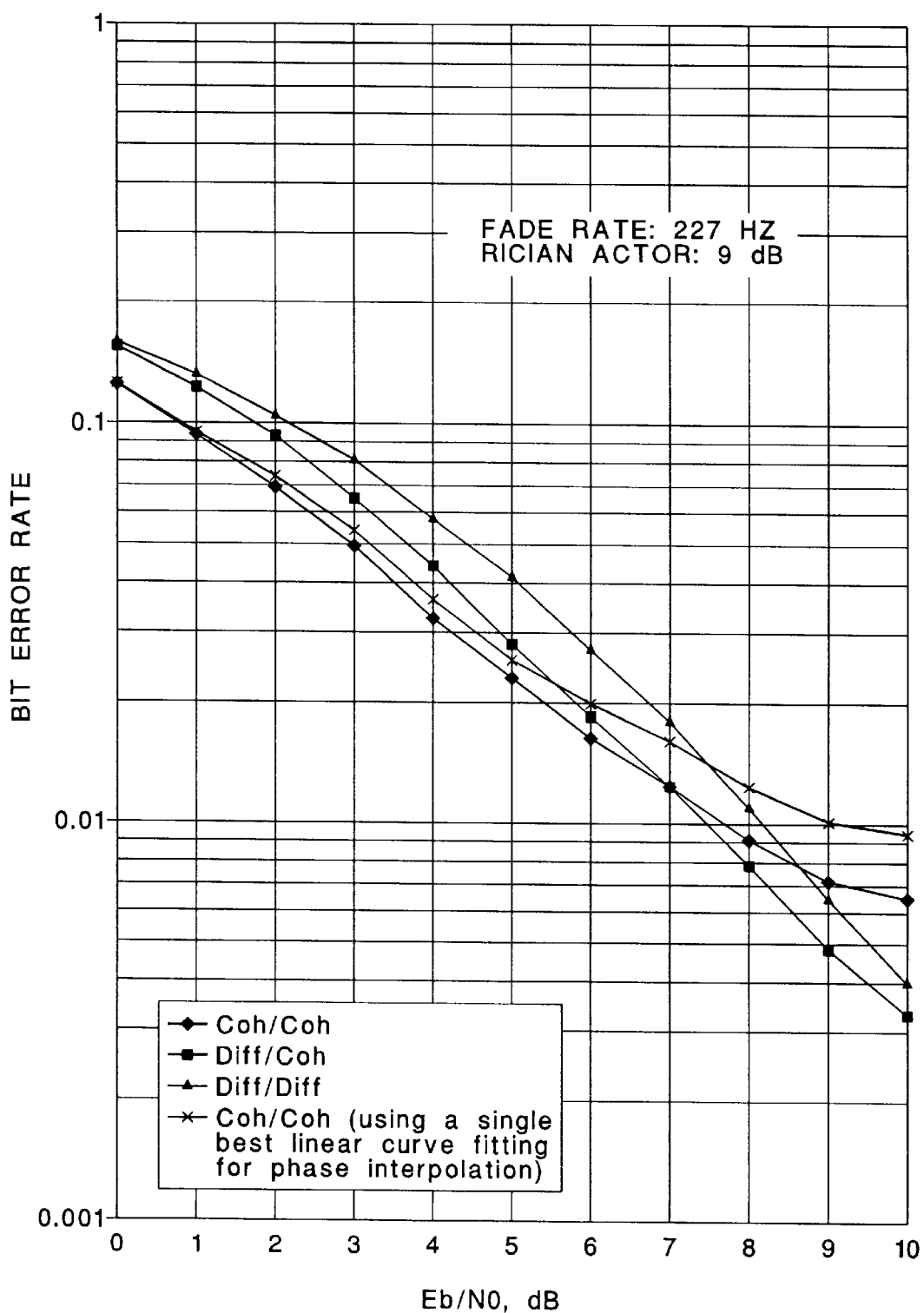
FIG. 12 is a graph of a performance comparison of coherent modulation and differential modulation on a faster fading Rician channel.

Referring next to FIG. 12, a graph is shown of a performance comparison of coherent modulation and differential modulation on a faster fading Rician channel (faster than FIG. 11). Again, as seen, the coherent modulation yields the lower bit error rate.

Figure 13:
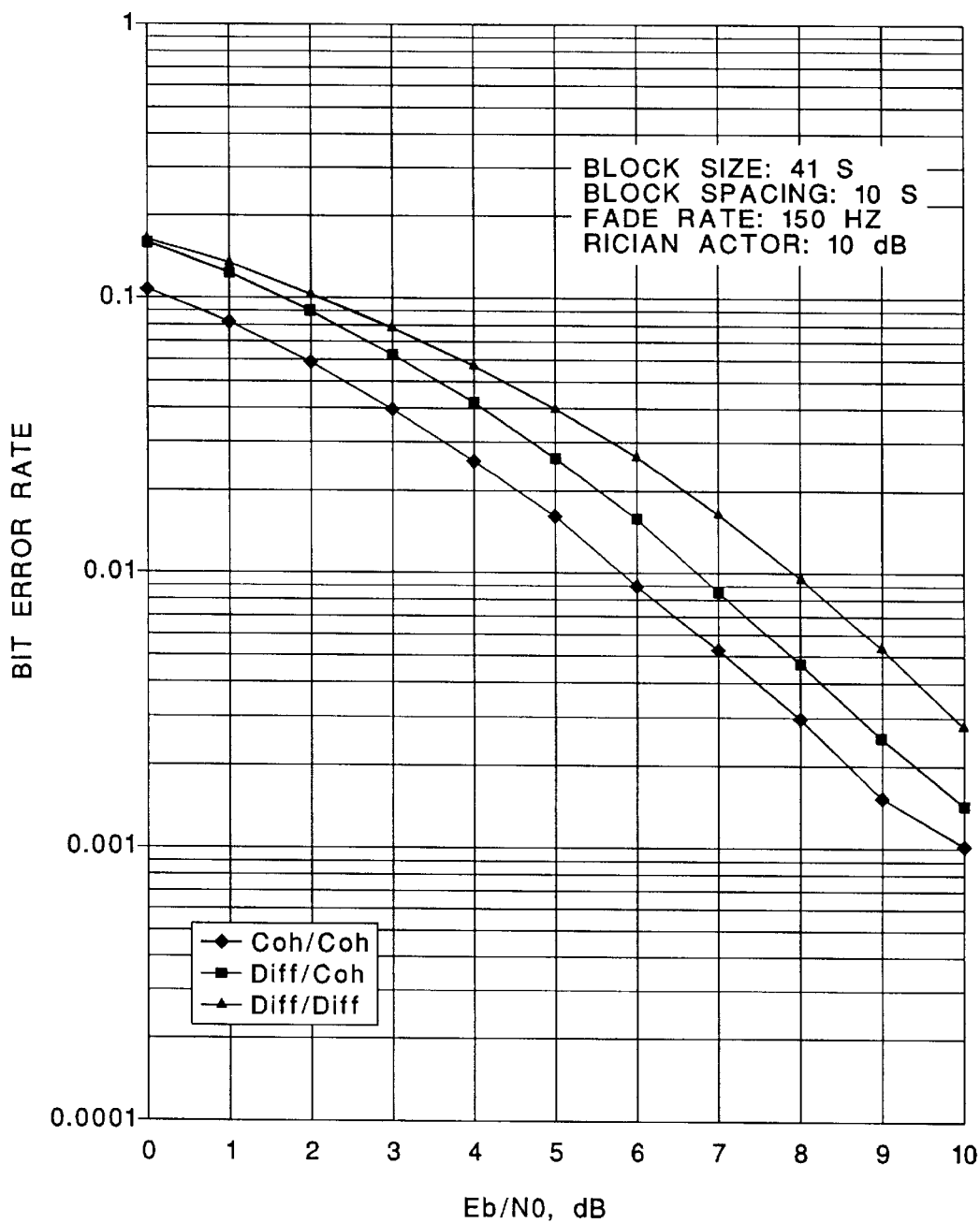
FIG. 13 is a graph of a performance comparison of coherent modulation and differential modulation on a medium fade rate Rician channel.

Referring next to FIG. 13, a graph is shown of a performance comparison of coherent modulation and differential modulation on a medium fade Rician channel. As seen, the coherent modulation yields the lower bit error rate.

Figure 14:
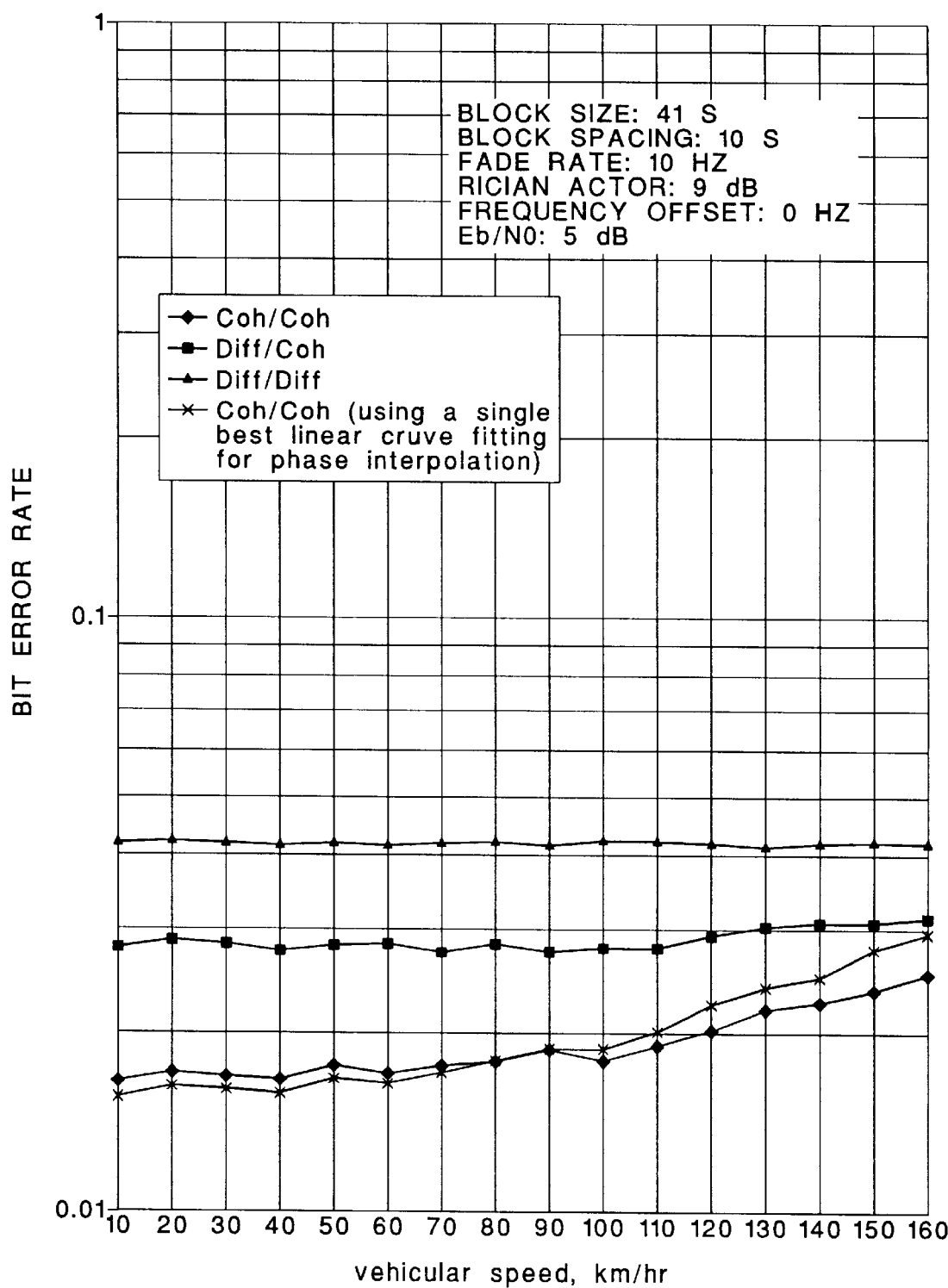
FIG. 14 is a graph of a performance comparison of coherent modulation and differential modulation versus vehicle speed at a fixed signal to noise ratio.

Referring next to FIG. 14, a graph is shown of a performance comparison of coherent modulation and differential modulation versus vehicle speed at a fixed signal to noise ratio. Again, the coherent modulation yields the lower bit error rate.

Figure 15:
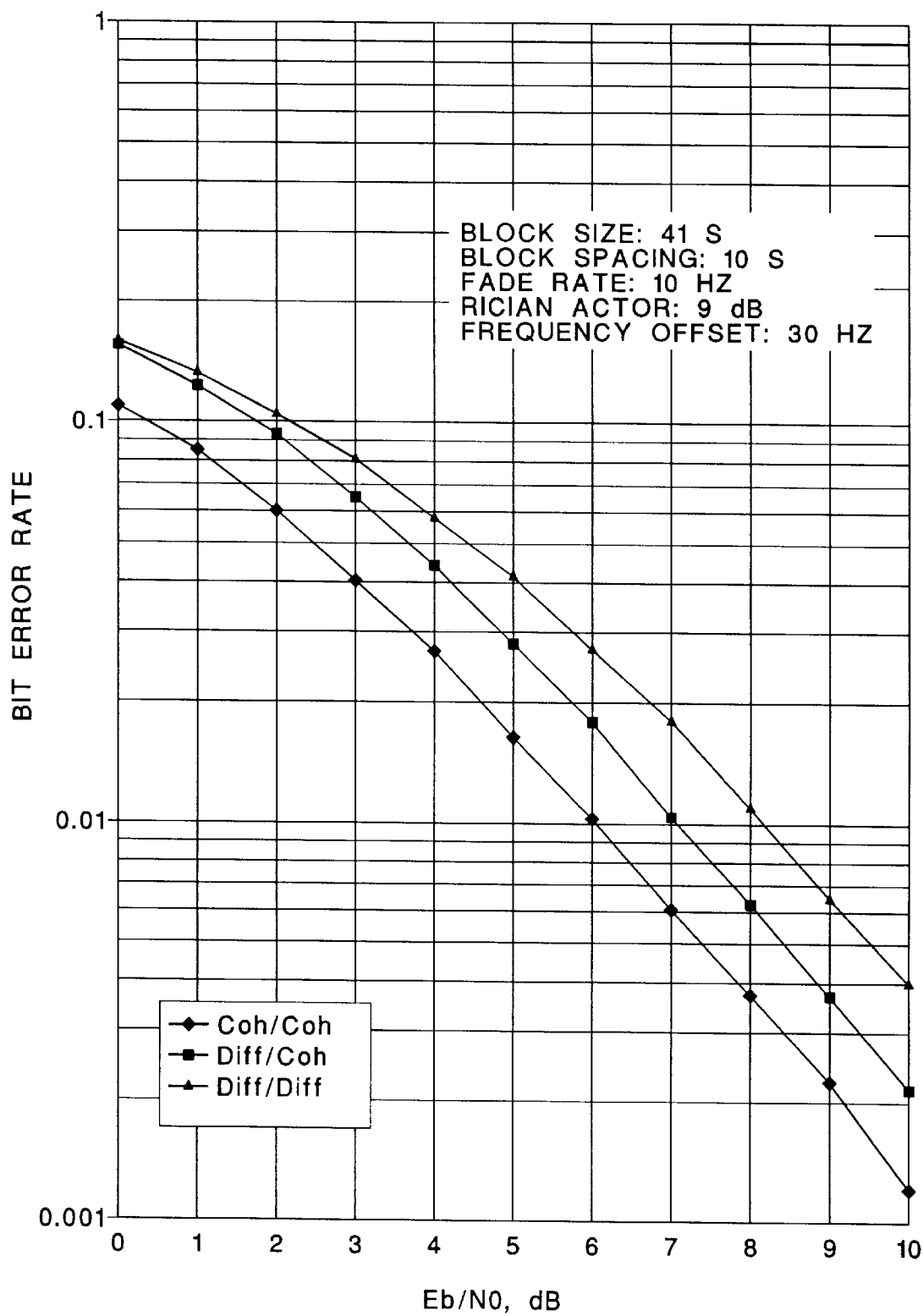
FIG. 15 is a graph of a performance sensitivity of coherent modulation and differential modulation to uncorrected frequency offset at 30 Hertz at a low fade rate.

Referring next to FIG. 15, a graph is shown of a performance sensitivity of coherent modulation and differential modulation to uncorrected frequency offset at 30 Hertz at a low fade rate. As seen, the coherent modulation yields the lower bit error rate.

Figure 16:
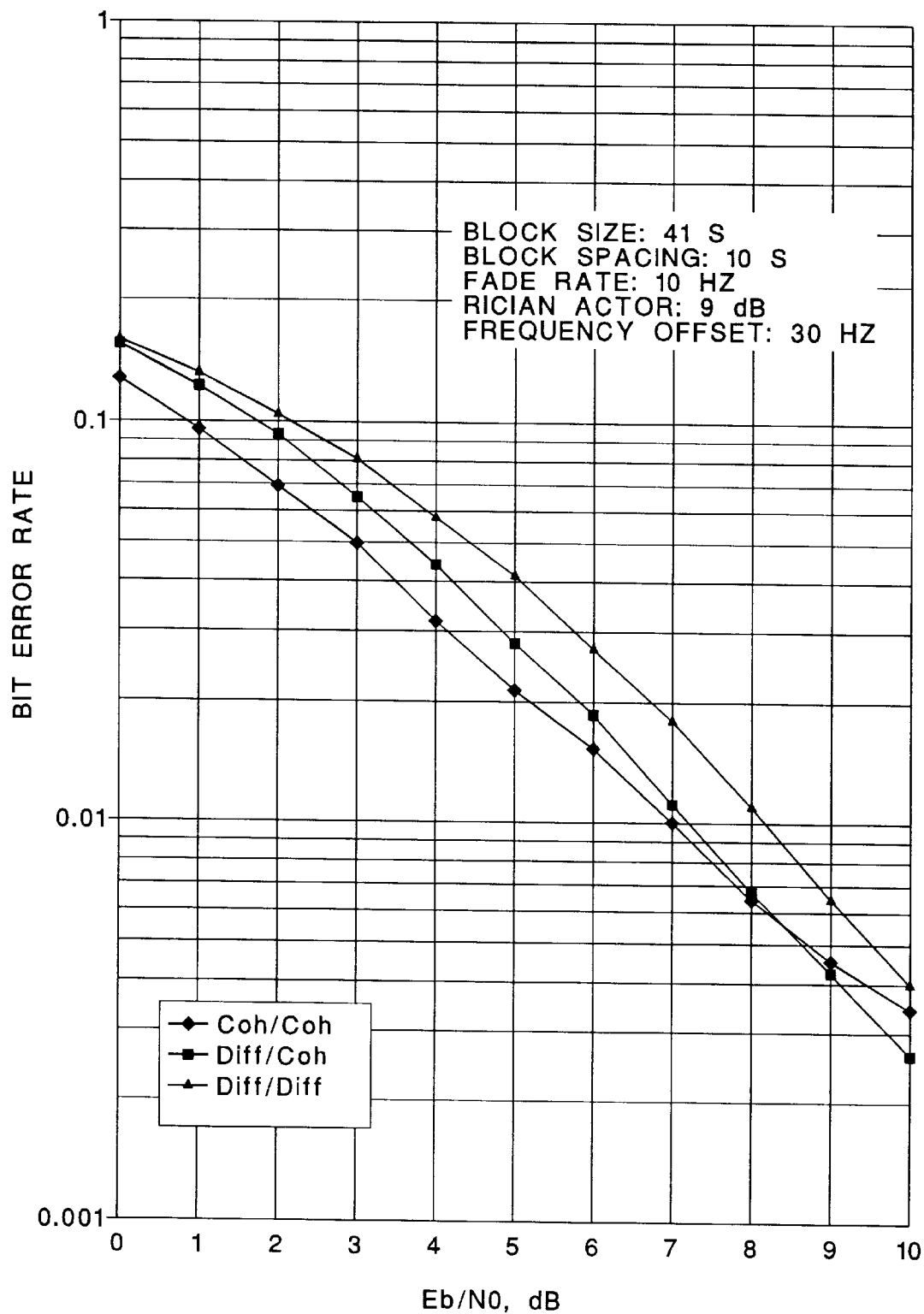
FIG. 16 is a graph of a performance sensitivity of coherent modulation and differential modulation to uncorrected frequency offset at 30 Hertz at a medium fade rate.

Referring next to FIG. 16, a graph is shown of a performance sensitivity of coherent modulation and differential modulation to uncorrected frequency offset at 30 Hertz at a medium fade rate. As seen, the coherent modulation yields the lower bit error rate.

Figure 17:
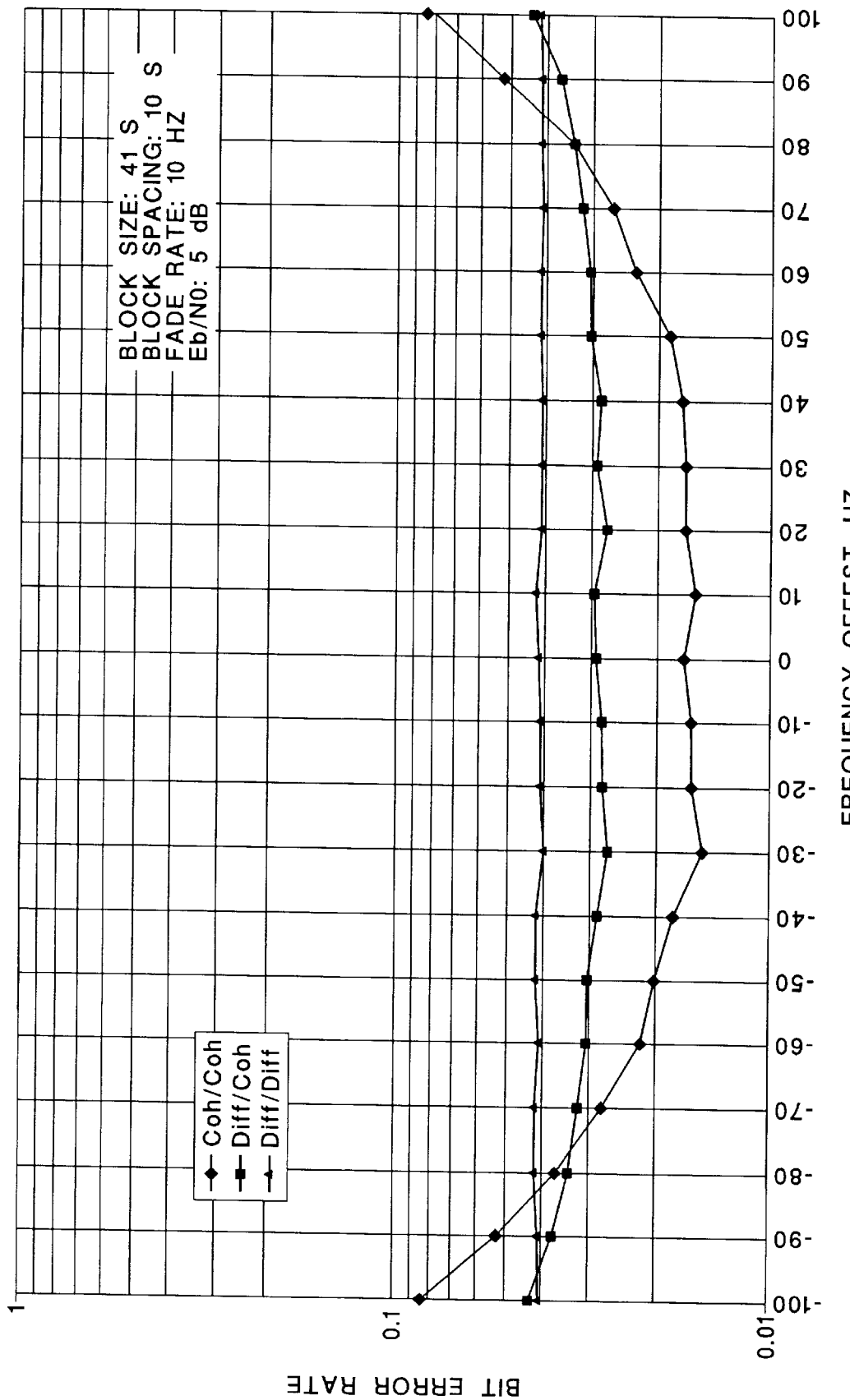
FIG. 17 is a graph of a performance sensitivity of coherent modulation and differential modulation to uncorrected frequency offset at a fixed Eb/No.

Referring next to FIG. 17, a graph is shown of a performance sensitivity of coherent modulation and differential modulation to uncorrected frequency offset at a fixed signal to noise ratio. As seen, the coherent modulation yields the lower bit error rate except at the highest frequency offsets.

Figure 18:
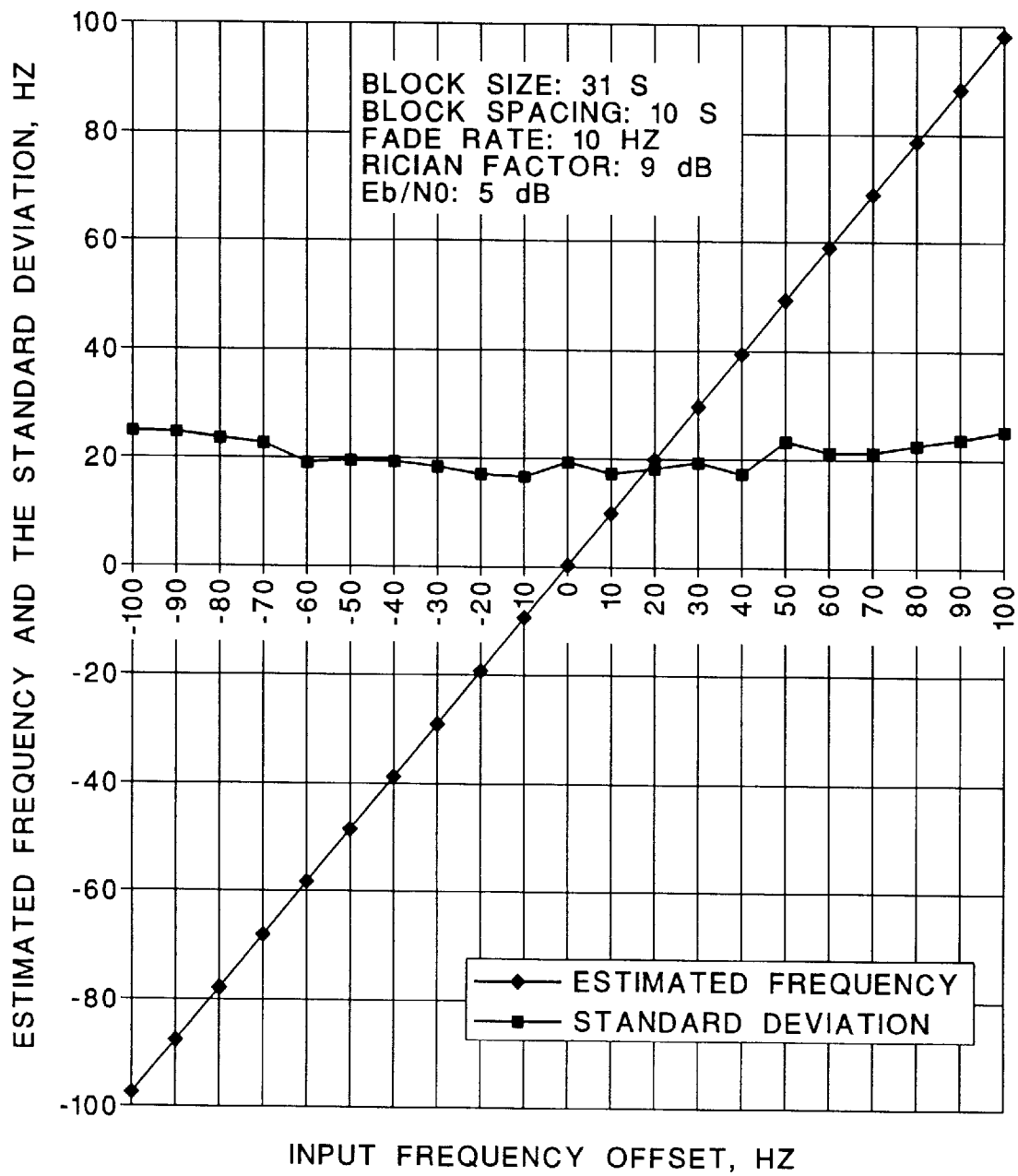
FIG. 18 is a graph of the performance of the frequency estimator.

Referring next to FIG. 18, a graph is shown of a performance of a frequency estimator versus the input frequency offset.

While the invention herein disclosed has been described by means of specific embodiments and applications thereof, numerous modifications and variations could be made thereto by those skilled in the art without departing from the scope of the invention set forth in the claims.

What is claimed is:

1. A method for coherent demodulation of phase-modulated digital data symbols which are coherently transmitted through an rf channel on an rf carrier, comprising:
    performing block-phase estimation on the transmitted data symbols to estimate a carrier phase error, wherein the block-phase estimation comprises processing the phase modulated data symbols using a nonlinear operation, wherein the nonlinear operation comprises multiplying a phase of the data symbols by a factor and raising a magnitude of the data symbols to a power, wherein the factor is different than the power;
    performing phase unwrapping on the block-phase estimated signal to account for rf channel phase transition effects; and
    removing the carrier phase error and rf channel phase transition effects from the transmitted phase-modulated data symbols based on the block phase estimation and the phase unwrapping.

2. A method for coherent demodulation as defined in claim 1, wherein the block phase estimation includes performing a linear phase interpolation using a moving averaging window that covers a predetermined block of data symbols.

3. A method for coherent demodulation as defined in claim 2, wherein the predetermined block of data symbols includes 41 symbols and the averaging window moves a specified number of symbols between phase interpolations.

4. A method for coherent demodulation as defined in claim 3, wherein the averaging window moves 10 symbols between phase interpolations.

5. A method for coherent demodulation as defined in claim 1, wherein said performing block-phase estimation comprises said performing block-phase estimation, wherein said factor of said nonlinear operation is greater than said power.

6. A method for coherent demodulation as defined in claim 1, wherein the transmitted data symbols are QPSK modulated and the nonlinear operation is a quadrupling of the data symbol's base angle and squaring the magnitude of the data symbol.

7. A method for coherent demodulation as defined in claim 1, further comprising performing a discrete Fourier transform on the transmitted data symbols to determine a frequency offset of the transmitted data symbols and eliminating any frequency offset contributing 90 degrees or more between data symbols.

8. Apparatus for coherently demodulating phase-modulated digital data symbols which are coherently transmitted through an rf channel, comprising:
    a baseband converter having a mixing frequency control input responsive to a frequency control signal for downconverting the data symbols transmitted through the rf channel to a baseband signal, the frequency control signal for removing frequency tracking error from the baseband signal;
    an analog-to-digital converter that samples the baseband signal to generate a sampled baseband signal;
    a digital signal processor that performs block-phase estimation by processing the phase modulated data symbols using a nonlinear operation, wherein the nonlinear operation comprises multiplying a phase of the data symbols by a factor and raising a magnitude of the data symbols to a power, wherein the factor is different than the power, and phase unwrapping on the block-phase estimated sampled baseband signal for generating a frequency offset signal; and
    a frequency controller that generates the frequency control signal, based on the frequency offset signal.

9. Apparatus for coherent demodulation as defined in claim 8, wherein the block phase estimation includes performing a linear phase interpolation using a moving averaging window that covers a predetermined block of data symbols.

10. Apparatus for coherent demodulation as defined in claim 9, wherein the predetermined block of data symbols includes 41 symbols and the averaging window moves a specified number of symbols between phase interpolations.

11. Apparatus for coherent demodulation as defined in claim 10, wherein the moving averaging window moves 10 symbols between phase interpolations.

12. Apparatus for coherent demodulation as defined in claim 8, wherein said digital signal processor comprises said digital signal processor wherein said factor of said nonlinear operation is greater than said power.

13. Apparatus for coherent demodulation as defined in claim 8, wherein the transmitted data symbols are QPSK modulated and the nonlinear operation is a quadrupling of the data symbol's base angle, and squaring the magnitude of the data symbol.

14. Apparatus for coherent demodulation as defined in claim 8, wherein the digital signal processor further performs a discrete Fourier transform on the transmitted data symbols to determine a frequency offset of the transmitted data symbols for generating the frequency control signal so that any frequency offset greater than or equal to 90 degrees between data symbols is eliminated.

15. A method for coherent demodulation of phase-modulated digital data symbols which are coherently transmitted through an rf channel on an rf carrier, comprising:
    performing block-phase estimation on the transmitted data symbols to estimate a carrier phase error using a moving averaging window comprising:
        performing block phase estimation on the data symbols contained within the moving averaging window to estimate the carrier phase error of a first data symbol within the moving averaging window, wherein the moving averaging window covers a predetermined number of data symbols;

moving the moving averaging window a specified number of data symbols;

performing block phase estimation on the data symbols contained within the moving averaging window having been moved by the specified number of data symbols to estimate the carrier phase error of a data symbol offset from the first data symbol by the specified number of data symbols; and performing a linear phase interpolation to estimate the carrier phase error for intervening data symbols between the first data symbol and the data symbol offset by the specified number of data symbols;

performing phase unwrapping on the block-phase estimated signal to account for rf channel phase transition effects; and removing the carrier phase error and rf channel phase transition effects from the transmitted phase-modulated data symbols based on the block phase estimation and the phase unwrapping.

16. The method of coherent demodulation as defined in claim 15, wherein the moving averaging window covers 41 data symbols and the moving averaging window moves 10 data symbols in between linear phase interpolations.

17. The method of coherent demodulation as defined in claim 15, wherein said linear phase interpolation is a 2-point piecewise linear phase interpolation.

18. The method of claim 15 wherein said performing block-phase estimation steps comprise processing the phase modulated data symbols using a nonlinear operation.

19. The method of claim 18 wherein said nonlinear operation comprises multiplying a phase of the data symbols by a factor and raising a magnitude of the data symbols to a power, wherein the factor is different than the power.

20. Apparatus for coherently demodulating phase-modulated digital data symbols which are coherently transmitted through an rf channel, comprising:

a baseband converter having a mixing frequency control input responsive to a frequency control signal for downconverting the data symbols transmitted through the rf channel to a baseband signal, the frequency control signal for removing frequency tracking error from the baseband signal;

an analog-to-digital converter that samples the baseband signal to generate a sampled baseband signal;

a digital signal processor that performs block-phase estimation and phase unwrapping on the block-phase estimated sampled baseband signal for generating a frequency offset signal, wherein the block phase estimation comprises:

performing block phase estimation on the data symbols contained within a moving averaging window that covers a predetermined number of data symbols to estimate the carrier phase error of a first data symbol within the moving averaging window;

moving the moving averaging window a specified number of data symbols;

performing block phase estimation on the data symbols contained within the moving averaging window having been moved by the specified number of data symbols to estimate the carrier phase error of a data symbol offset from the first data symbol by the specified number of data symbols; and performing a linear phase interpolation to estimate the carrier phase error for the data symbols between the first data symbol and the data symbol offset by the specified number of data symbols; and a frequency controller that generates the frequency control signal, based on the frequency offset signal.

21. Apparatus for coherent demodulation as defined in claim 20, wherein said linear phase interpolation is a 2-point piecewise linear phase interpolation.

22. Apparatus for coherent demodulation as defined in claim 20, wherein said performing block phase estimation steps performed by said digital signal processor comprise processing the phase modulated data symbols using a nonlinear operation.

23. Apparatus for coherent demodulation as defined in claim 22 wherein said nonlinear operation comprises multiplying a phase of the data symbols by a factor and raising a magnitude of the data symbols to a power, wherein the factor is different than the power.

* * * * *